(12) United States Patent
Yang

(10) Patent No.: US 9,827,580 B2
(45) Date of Patent: Nov. 28, 2017

(54) SPRAY STRUCTURE FOR TEMPERATURE REGULATION

(71) Applicant: Cheng-Chuan Yang, Taichung (TW)

(72) Inventor: Cheng-Chuan Yang, Taichung (TW)

( * ) Notice: Subject to any disclaimer, the term of this patent is extended or adjusted under 35 U.S.C. 154(b) by 169 days.

(21) Appl. No.: 14/874,475

(22) Filed: Oct. 5, 2015

(65) Prior Publication Data

US 2017/0095824 A1 Apr. 6, 2017

(51) Int. Cl.
*F25B 21/02* (2006.01)
*B05B 9/00* (2006.01)
*B05B 9/04* (2006.01)
*F25B 19/04* (2006.01)
*F25D 7/00* (2006.01)
*F24F 5/00* (2006.01)

(52) U.S. Cl.
CPC ............ *B05B 9/002* (2013.01); *B05B 9/0403* (2013.01); *F24F 5/0035* (2013.01); *F24F 5/0042* (2013.01); *F25B 19/04* (2013.01); *F25B 21/02* (2013.01); *F25D 7/00* (2013.01); *F25B 2321/0252* (2013.01)

(58) Field of Classification Search
CPC ....... F24F 5/0035; F24F 5/0042; B05B 9/002; B05B 9/0403; F25B 19/04; F25B 21/02
See application file for complete search history.

(56) References Cited

U.S. PATENT DOCUMENTS 6,418,728 B1 * 7/2002 Monroe ................ F24F 5/0035
62/3.2
2008/0135224 A1 * 6/2008 Pun ....................... F24F 5/0035
165/247

* cited by examiner

*Primary Examiner* — Len Tran
*Assistant Examiner* — Ana Vazquez
(74) *Attorney, Agent, or Firm* — Rosenberg, Klein & Lee

(57) ABSTRACT

A spray structure for temperature regulation includes a spray system and a heat exchange cycling system. The heat exchange cycling system includes a thermal chip for providing a temperature regulation water which is received in the spray system to exchange energies. After the temperature regulation water is flowed through the thermal chip to exchange energies, the temperature regulation water is atomized by the spray system to regulate an inner temperature inside a space.

5 Claims, 4 Drawing Sheets

SPRAY STRUCTURE FOR TEMPERATURE REGULATION

BACKGROUND OF THE INVENTION

1. Field of the Invention

The present invention relates to a spray structure for temperature regulation and more particularly to a spray structure capable for heat exchange with a thermal chip and pressurizing to atomize and spray so as to regulate the temperature in a space, improve the comfort level in the environment, and not result in Green House Effect and the issues of environmental protection.

2. Description of the Related Art

In the summer with an average temperature of 34~35° C., lots of people cannot keep calm to work and study if there is no air conditioner indoors. However, the general air conditioner is used a compressor to compress the coolants to the gaseous coolants with a high pressure and a high temperature, a condenser to cool the gaseous coolants to the liquid coolants with a high pressure and a middle temperature, and an expansion valve to decompress the liquid coolants with the high pressure and the middle temperature to the liquid coolants with a low pressure and a low temperature. And then, the cool air is blown indoors by a fan. When the cool air which is generated from the coolants is blown indoors to lower the indoor temperature, the location of the air conditioner is at a high temperature. The coolants are poisonous and damaged the ozone layer to result in Green House Effect. Therefore, the US and European Union have made a protocol to make an appointment that the materials which may damage the ozone layer gradually decrease to use and even prohibit the use of them till year 2030. As a result, the air conditioner which uses the coolants must be replaced to solve the issues thereof.

In view of the foregoing circumstances, the inventor has invested a lot of time to study the relevant knowledge, compare the pros and cons, research and develop related products. After quite many experiments and tests, the "spray structure for temperature regulation" of this invention is eventually launched to improve the foregoing shortcomings, to meet the public use.

SUMMARY OF THE INVENTION

Accordingly, it is an object of the present invention to provide a spray system for temperature regulation. The temperature in a space may be regulated by a thermal chip. And the heat which is generated from the exchange of the thermal chip may be not dissipated to the environment to result in Green House Effect and the issue of environmental protection. The heat is absorbed by the heat exchange cycling system to improve the issue of the use of the coolants which are used in the air conditioner in prior art.

Another object of the present invention is to provide a spray system for temperature regulation. In summer, the cooling end of the thermal chip is selected to lower the indoor temperature and regulate to cool room temperature. In winter, the heating end of the thermal chip is elected to higher the indoor temperature and regulate to warm room temperature. Therefore, the spray structure of the present invention may include the functions of the air conditioner and a heater.

To achieve the foregoing objective, the spray system for temperature regulation comprises a spray system and a heat exchange cycling system, wherein: the heat exchange cycling system includes a thermal chip for providing a temperature regulation water received in the spray system to exchange energies, and after the temperature regulation water is flowed through the thermal chip to exchange energies, the temperature regulation water is atomized by the spray system to regulate an inner temperature inside a space.

In some embodiments, the heat exchange cycling system further includes a reservoir, a fan, and a piping assembly, the piping assembly is fluidly communicated with the reservoir and the thermal chip, a cycling water is received in the reservoir, the cycling water is flowed from the reservoir toward the thermal chip and cooled by the fan firstly, and then the cycling water is contacted with and absorbed the heat exchanged by the thermal chip and cycled to the reservoir.

In some embodiments, the spray system further includes a temperature regulation tank and a spray tank, the temperature regulation water is received in the temperature regulation tank, the temperature regulation water is flowed in the spray tank after flowing through the thermal chip to exchange energies, the spray tank further includes a pressure nozzle for atomizing and spraying the temperature regulation water.

In some embodiments, the spray tank is connected with a temperature regulation chip, the temperature regulation water flowed in the spray tank is exchanged energies by the temperature regulation chip so that the temperature regulation water is kept at a constant temperature, the temperature regulation chip is fluidly communicated with the reservoir and the temperature regulation chip through an auxiliary piping assembly, the cycling water in the reservoir is flowed toward the temperature regulation chip and cooled by the fan, and then the cycling water is contacted with and absorbed the heat exchanged by the temperature regulation chip and cycled to the reservoir.

In some embodiments, the thermal chip has a cooling end and a heating end, the temperature regulation water is cooled while being connected with the cooling end and heated while being connected with the heating end.

In some embodiments, the spray system further includes a pumping motor, and the pumping motor is connected with the temperature regulation tank and the spray tank.

In some embodiments, the spray system further includes a makeup tank, and the makeup tank is connected with the temperature regulation tank for supplying water to the temperature regulation tank.

Therefore, the temperature regulation water is exchanged energies through the thermal chip and pressurized to spray to the space so as to regulate the temperature in the space and improve the comfort level in the environment. And the heat which is generated from the exchange of the thermal chip may be not dissipated to the environment to result in Green House Effect and the issue of environmental protection.

Further benefits and advantages of the present invention will become apparent after a careful reading of the detailed description with appropriate reference to the accompanying drawings.

DETAILED DESCRIPTION OF EMBODIMENTS

To describe clearly that the present invention achieves the foregoing objective and function, the technical features and desired function are described with reference to a preferred embodiment and accompanying drawings.

Figure 1:
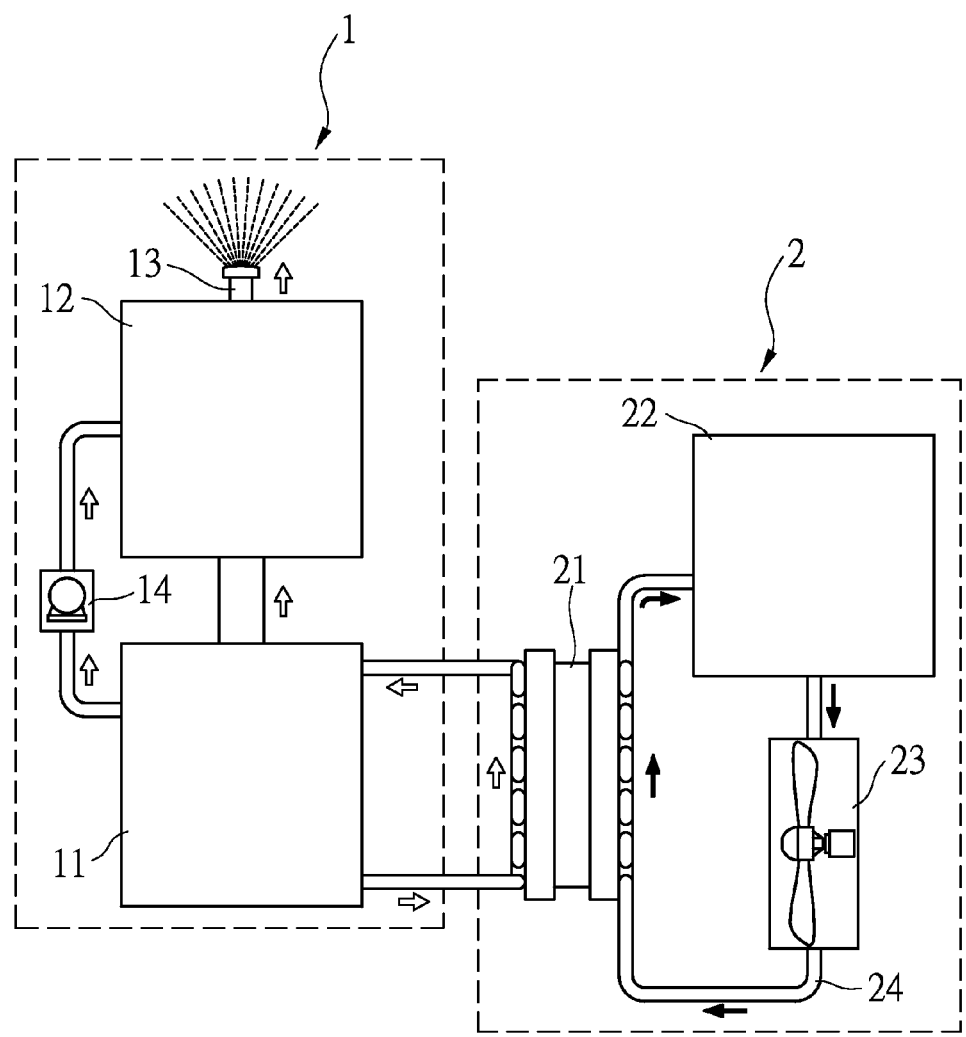
FIG. 1 is a structural block diagram of a spray system for temperature regulation in accordance with a first preferred embodiment of the present invention.

Please refer to FIG. 1, a spray structure for temperature regulation of the present invention may comprise a spray system 1 and a heat exchange cycling system 2. The heat exchange cycling system 2 may include a thermal chip 21. The thermal chip 21 provides a temperature regulation water (shown as the arrow in FIG. 1) which is received in the spray system to exchange energies. After the temperature regulation water is flowed through the thermal chip 21 to exchange energies, the temperature regulation water is atomized by the spray system 1 to regulate an inner temperature inside a space.

The spray system 1 further includes a temperature regulation tank 11 and a spray tank 12. The temperature regulation water (shown as the arrow ⇧ in FIG. 1) is received in the temperature regulation tank 11. The temperature regulation water is flowed in the spray tank 12 after flowing through the thermal chip 21 to exchange energies. The spray tank 12 further includes a pressure nozzle 13 for atomizing and spraying the temperature regulation water. The cooled temperature regulation water is sprayed to indoor after the thermal chip 21 exchanges energies so that the temperature of the ambient air is cooled by the evaporation of the temperature regulation water. In this embodiment, the capacity of the temperature regulation tank 11 is 10 liters and the capacity of the spray tank 12 is 3 liters. The capacity of the temperature regulation tank 11 is larger than the capacity of the spray tank 12 so that the indoor temperature may be cooled when there are many people indoors or special demands. The spray tank 12 has the pressure nozzle 13 and the smaller capacity may increase the efficiency of the pressure nozzle 13. Therefore, a pumping motor 14 may be arranged between the temperature regulation tank 11 and the spray tank 12. The pumping motor 14 is connected with the temperature regulation tank 11 and the spray tank 12 so that the temperature regulation water which is received in the temperature regulation tank 11 may more quickly pumped into the spray tank 12. The heat exchange cycling system 2 further includes a reservoir 22, a fan 23, and a piping assembly 24. The piping assembly 24 is fluidly communicated with the reservoir 22 and the thermal chip 21. A cycling water is received in the reservoir 22. At this moment, the temperature of the cycling water is almost the same as the indoor temperature and the temperature is about 30~35° C. The cycling water (shown as the arrow → in FIG. 1) is flowed from the reservoir 22 toward the thermal chip 21 and cooled by the fan 23 firstly, and then the cooled cycling water (about 20~25° C.) is contacted with and absorbed the heat exchanged by the thermal chip 21 (at this moment, the temperature of the cycling water may be a little higher) and cycled to the reservoir 22 for next use. Therefore, the heat which is generated from the exchange of the thermal chip 21 may be not dissipated to the environment to result in Green House Effect and the issue of environmental protection. The heat is absorbed by the heat exchange cycling system 2 to improve the issue of the use of the coolants which are used in the air conditioner in prior art.

Figure 2:
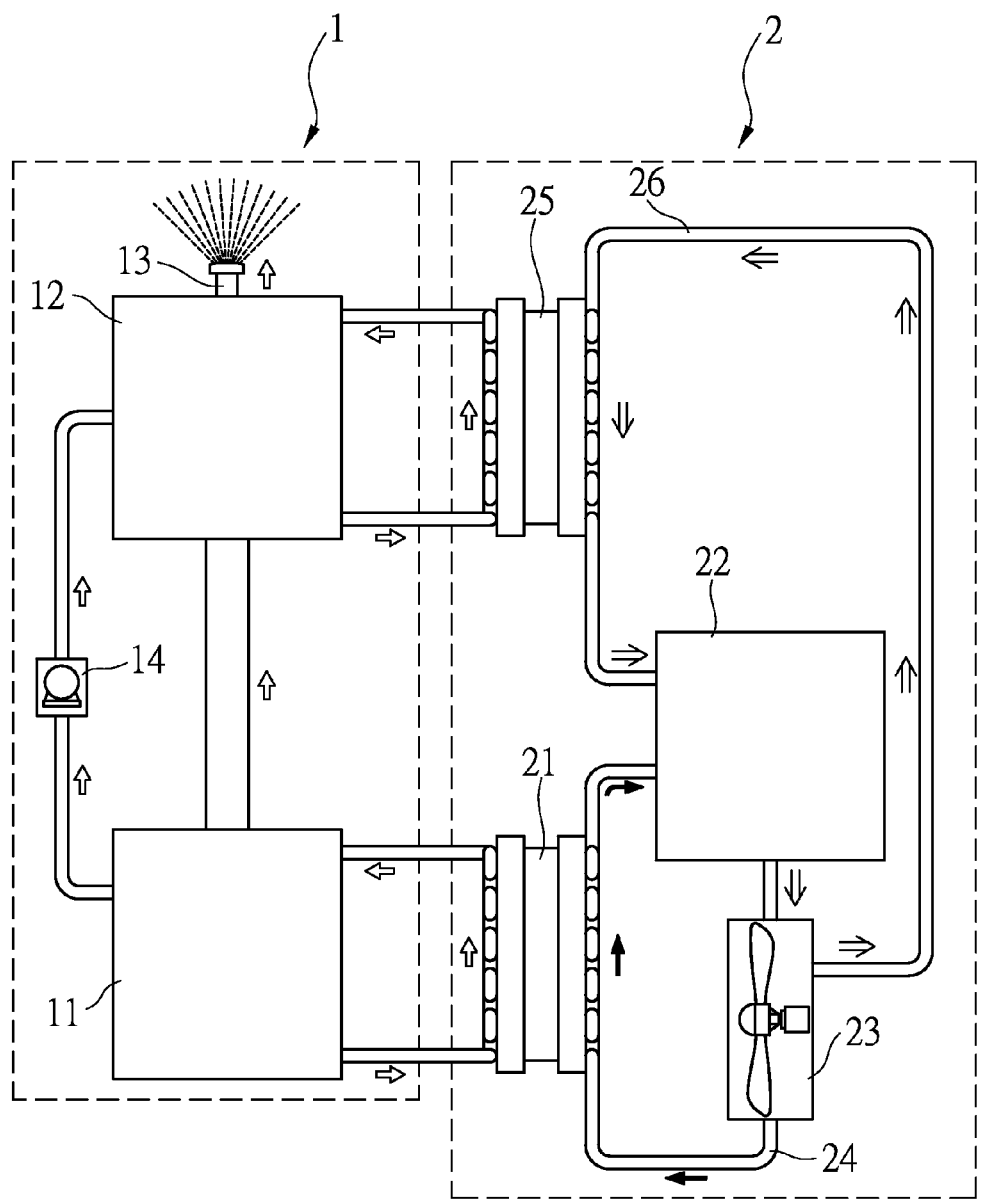
FIG. 2 is a structural block diagram of a spray system for temperature regulation in accordance with a second preferred embodiment of the present invention.

Please refer to FIG. 2, based on the above descriptions of the temperature regulation tank 11 and the spray tank 12, the spray tank 12 is further connected with a temperature regulation chip 25. The temperature regulation water (shown as the arrow ☐ in FIG. 2) which is flowed in the spray tank 12 is exchanged energies by the temperature regulation chip 25 so that the temperature regulation water is kept at a constant temperature and sprayed and atomized by the pressure nozzle 13 to make the indoor temperature lower. The temperature regulation chip 25 is fluidly communicated with the reservoir 22 and the temperature regulation chip 25 through an auxiliary piping assembly 26. The cycling water (shown as the arrow ⇒ in FIG. 2) which is received in the reservoir 22 is flowed toward the temperature regulation chip 25 and cooled by the fan 23, and then the cycling water is contacted with and absorbed the heat exchanged by the temperature regulation chip 25 and cycled to the reservoir 22. Similarly, the heat which is generated from the exchange between the temperature regulation chip 25 and the temperature regulation water received in the spray tank 12 may be not dissipated to the environment to result in Green House Effect and the issue of environmental protection. The heat is absorbed by the heat exchange cycling system 2 to improve the issue of the use of the coolants which are used in the air conditioner in prior art.

Figure 3:
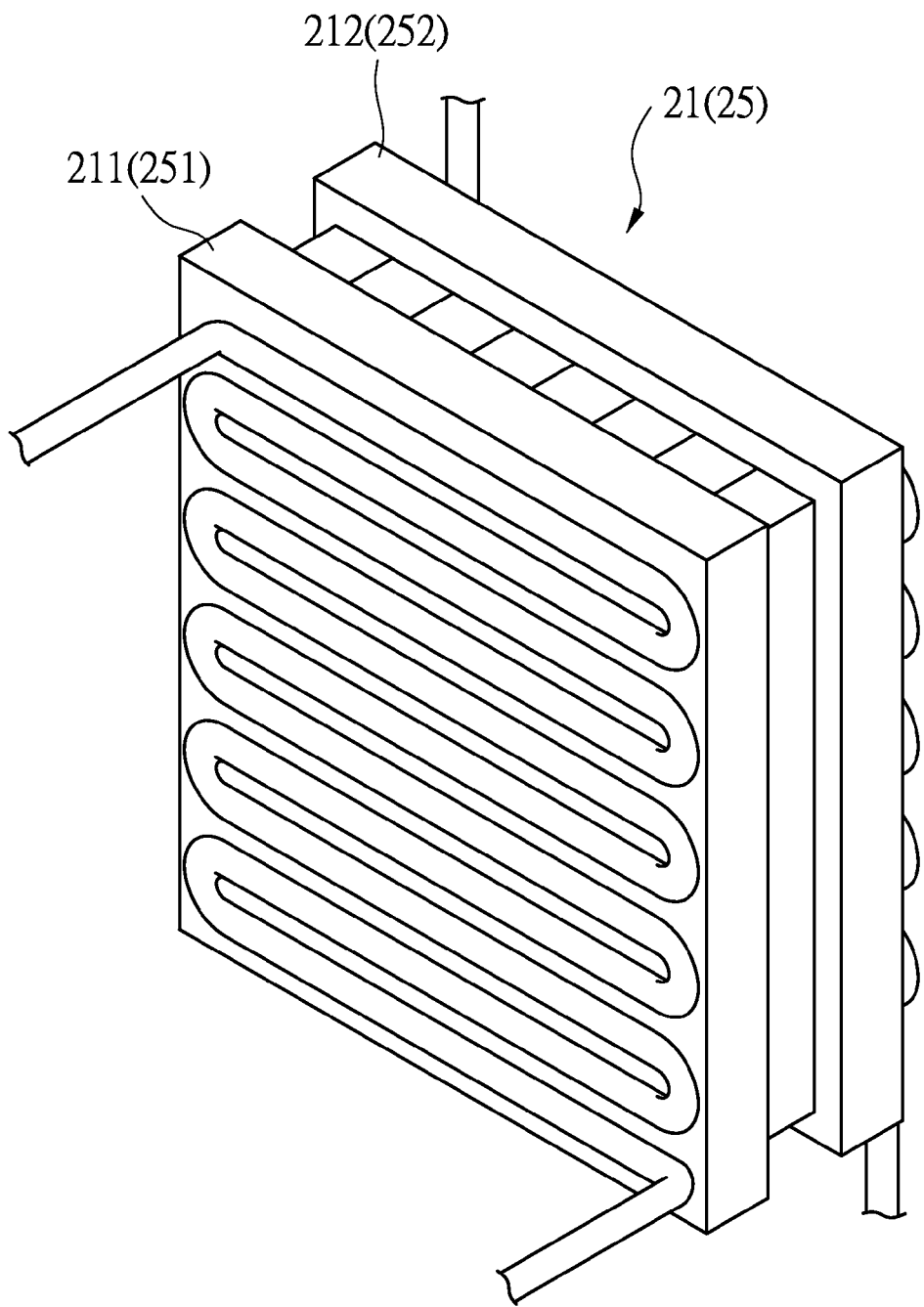
FIG. 3 is a perspective view of a thermal chip (temperature regulation chip) of the spray structure of the present invention.

Please refer to FIG. 3, the structure of the thermal chip 21 of the heat exchange cycling system 2 is the same as the structure of the temperature regulation chip 25 and may be a thermoelectric cooler. The thermoelectric cooler is made by semiconductors. When the current is passing through a galvanic couple which is made by two different semiconductor materials, one end of the thermoelectric cooler is for absorbing heat and the other end thereof is for dissipating heat. When a current is passing through the thermoelectric cooler, the heat which is generated from the current may be transmitted from one end to the other end. The "HEAT" end and the "COOL" end of the thermoelectric cooler is the heating and cooling principle of the thermoelectric cooler. Therefore, the thermal chip 21 has a cooling end 211 and a heating end 212, and the temperature regulation chip 25 also has a cooling end 251 and a heating end 252 for cooling and heating respectively. That is, when the temperature regulation water is connected with the cooling end 211 (or 251), it may be cooled. When the temperature regulation water is connected with the heating end 212 (or 252), it may be heated. The spray structure of the present invention may achieve the effects of heating and cooling with the thermal chip 21 and the temperature regulation chip 5. In summer, the cooling end 211 (or 251) is selected to lower the indoor temperature and regulate to cool room temperature. In winter, the heating end 212 (or 252) is elected to higher the indoor temperature and regulate to warm room temperature. Therefore, the spray structure of the present invention may include the functions of the air conditioner and a heater.

Figure 4:
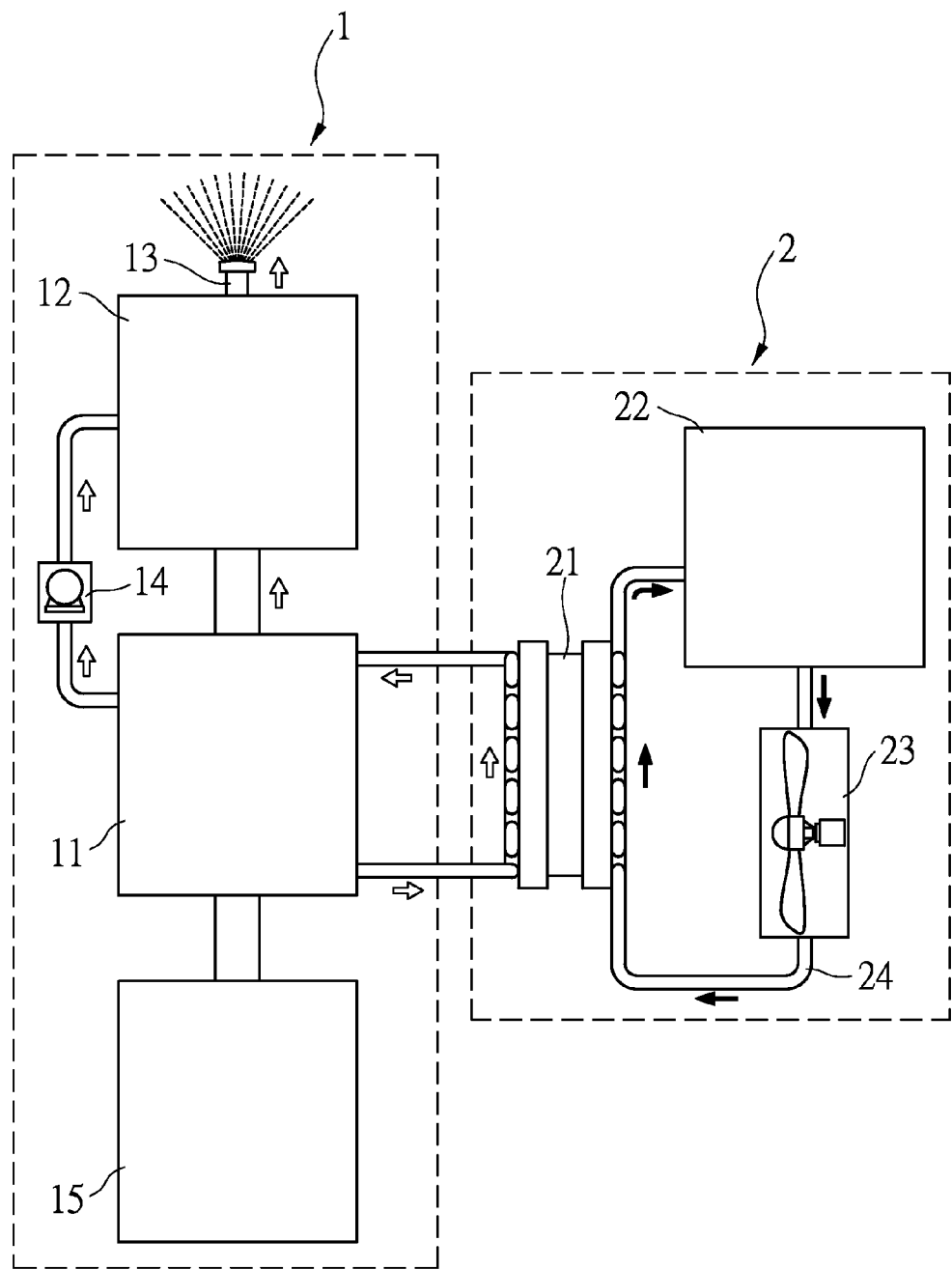
FIG. 4 is a structural block diagram of a spray system for temperature regulation in accordance with a third preferred embodiment of the present invention.

Please refer to FIG. 4, the spray system 1 may further include a makeup tank 15. The makeup tank 15 is connected with the temperature regulation tank 11. The capacity of the makeup tank 15 is larger than the capacity of the temperature regulation tank 11. Therefore, a user may supply water to the makeup tank 15 for supplying water to the temperature regulation tank 11.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A spray structure for temperature regulation, comprising a spray system and a heat exchange cycling system, wherein:

the heat exchange cycling system includes a thermal chip, a reservoir, a fan and a piping assembly, the piping assembly is fluidly communicated with the reservoir and the thermal chip, a cycling water is received in the reservoir, the cycling water is flowed from the reservoir toward the thermal chip and cooled by the fan firstly, and then the cycling water is contacted with and absorbed the heat exchanged by the thermal chip and cycled to the reservoir;

the spray system includes a temperature regulation tank and a spray tank, the temperature regulation water is received in the temperature regulation tank, the temperature regulation water is flowed in the spray tank after flowing through the thermal chip to exchange energies, the spray tank includes a pressure nozzle for atomizing and spraying the temperature regulation water, and the spray tank is connected with a temperature regulation chip, the temperature regulation water flowed in the spray tank is exchanged energies by the temperature regulation chip so that the temperature regulation water is kept at a constant temperature, the temperature regulation chip is fluidly communicated with the reservoir and the fan through an auxiliary piping assembly, the cycling water in the reservoir is flowed toward the temperature regulation chip and cooled by the fan, and then the cycling water is contacted with and absorbed the heat exchanged by the temperature regulation chip and cycled to the reservoir.

2. The spray structure of claim 1, wherein the thermal chip has a cooling end and a heating end, the temperature regulation water is cooled while being connected with the cooling end and heated while being connected with the heating end.

3. The spray structure of claim 1, wherein the spray system further includes a pumping motor, and the pumping motor is connected with the temperature regulation tank and the spray tank.

4. The spray structure of claim 1, the spray system further includes a makeup tank, and the makeup tank is connected with the temperature regulation tank for supplying water to the temperature regulation tank.

5. The spray structure of claim 1, wherein the thermal chip has a cooling end and a heating end, the temperature regulation water is cooled while being connected with the cooling end and heated while being connected with the heating end.

\* \* \* \* \*